United States Patent
Loikkanen et al.

(10) Patent No.: US 12,024,951 B2
(45) Date of Patent: Jul. 2, 2024

(54) ROLLER CUTTING TOOL WITH IMPROVED SEALING

(71) Applicant: SANDVIK MINING AND CONSTRUCTION TOOLS AB, Sandviken (SE)

(72) Inventors: Joona Loikkanen, Sandviken (SE); Anders Lindblom, Sandviken (SE)

(73) Assignee: Sandvik Mining and Construction Tools AB, Sandviken (SE)

( * ) Notice: Subject to any disclaimer, the term of this patent is extended or adjusted under 35 U.S.C. 154(b) by 0 days.

(21) Appl. No.: 17/800,960

(22) PCT Filed: Feb. 17, 2021

(86) PCT No.: PCT/EP2021/053893
§ 371 (c)(1),
(2) Date: Aug. 19, 2022

(87) PCT Pub. No.: WO2021/165323
PCT Pub. Date: Aug. 26, 2021

(65) Prior Publication Data
US 2023/0072404 A1 Mar. 9, 2023

(30) Foreign Application Priority Data
Feb. 21, 2020 (EP) .................................. 20158642

(51) Int. Cl.
*E21B 10/25* (2006.01)

(52) U.S. Cl.
CPC .......... *E21B 10/25* (2013.01); *F16C 2352/00* (2013.01)

(58) Field of Classification Search
None
See application file for complete search history.

(56) References Cited

U.S. PATENT DOCUMENTS

| | | | | |
|---|---|---|---|---|
| 3,303,898 A | * | 2/1967 | Bercaru | ................ E21B 10/25 384/93 |
| 3,572,452 A | | 3/1971 | Winberg | |
| 4,509,607 A | * | 4/1985 | Saxman | ................ F16C 33/664 175/227 |
| 6,123,337 A | | 9/2000 | Fang et al. | |
| 6,196,339 B1 | | 3/2001 | Portwood et al. | |

FOREIGN PATENT DOCUMENTS

EP 2781684 A1 9/2014

\* cited by examiner

*Primary Examiner* — Tara Schimpf
*Assistant Examiner* — Yanick A Akaragwe
(74) *Attorney, Agent, or Firm* — Corinne R. Gorski

(57) ABSTRACT

A roller cutter for a drill head for raise boring. The roller cutter having a shaft with a longitudinal center line, a hub rotatably mounted on the shaft, and a seal retainer located between the axial ends of the hub and the shaft at least arranged at one end of the roller cutter. The seal retainer supports a primary cutter seal providing sealing between the shaft and the hub in both axial and radial directions. A secondary cutter seal is located between the seal retainer and the hub, such that the secondary cutter seal provides sealing in the axial direction.

8 Claims, 6 Drawing Sheets

ROLLER CUTTING TOOL WITH IMPROVED SEALING

RELATED APPLICATION DATA

This application is a § 371 National Stage Application of PCT International Application No. PCT/EP2021/053893 filed Feb. 17, 2021 claiming priority to EP 20158642.7 filed Feb. 21, 2020.

TECHNICAL FIELD

The present invention is for a roller cutter for a drill head for the boring of earth and rock formations, and especially for raise boring operations.

BACKGROUND

Reamer bits for raise boring operations are used for drilling a raise by reaming a pilot hole to the desired final diameter. The drill bit is usually composed of a number of rolling cutters which are arranged in an annular pattern on a raise bit body and are rotated at the same time as the bit is fed upwardly, thus disintegrating the rock around the pilot hole. During the drilling the stem is located in the pilot hole, which has been drilled in advance.

However, there is a problem that known sealing solutions are not sufficient and still some cuttings, water and particles do enter the bearing system which, causing damage to and reducing the lifetime of the components of the roller cutter. Replacing these components is costly and time consuming and so it is desirable to reduce the frequency this is required to be done. Inadequate sealing also has the risk that there is a leakage of grease from the roller cutter which would lead to a loss of lubrication.

EP2781684 discloses a sealing system comprising O-rings made of a resilient material that forms a further radial seal, however the problem with this is that too much heat is generated which leads to accelerated degradation of the sealing system, thereby reducing the effectiveness of the seal.

Therefore, the problem to be solved is how to provide an improved sealing solution that is capable of effectively sealing without generating excessive heat and therefore increasing the lifetime of the components in the rotary cutter.

SUMMARY

It is an objective of this invention to provide a novel and improved sealing assembly for a roller cutter.

The objective is achieved by providing a roller cutter for a drill head for raise boring; said roller cutter having a shaft with a longitudinal centre line; a hub rotatably mounted on the shaft; a seal retainer located between the axial ends of the hub and the shaft at least arranged at one end of the roller cutter; the seal retainer supporting a primary cutter seal providing sealing between the shaft and the hub in both axial and radial directions, characterized in that: a secondary cutter seal is located between the seal retainer and the hub, and that the secondary cutter seal provides sealing in the axial direction.

Advantageously, by providing a seal between the seal retainer and the hub in an axial direction this protects the primary seal from damage. If damage to the primary seal is prevented or reduced this will mean that there is less chance of cuttings entering the roller cutter and wearing at its components. There is also a reduced risk of leakage of grease from the roller cutter which would lead to a loss of lubrication. This will ultimately reduce the time and cost spent replacing worn or damaged components of the roller cutters. If the primary cutter seal fails, this could lead to a complete system failure and reduction in the lifetime of the drill bit.

Preferably, the seal retainer has a radially upward projecting region having an axially outermost end and an axially innermost end and wherein the radially upward projecting region is stepped such the axially outermost end projects radially upwards more than the axially inner most end. Advantageously, the presence of the step in the seal retainer means that a secondary cutter seal can be accommodated therein. The presence of the step means that the secondary cutter seal is held stationary relative to the seal retainer, so that correct alignment with respect to the rotating hub is maintained even as the roller cutter rotates and vibrates. The presence of the step in the seal retainer also reduces the surface area of the secondary cutter seal being exposed to cuttings and therefore reduces the risk of damage to the secondary cutter seal occurring.

Preferably, the secondary cutter seal is made of a resilient material. By using a resilient material, it means that the secondary cutter seal is flexible and able to maintain a good seal against the hub even when the components of the drill bit move and vibrate.

Preferably, the secondary cutter seal is a v-ring, wiper or lip seal. Advantageously, these types of seal can form seal between and the seal retainer and the hub in the axial direction. Additionally, the contact area between the secondary cutter seal and the hub is kept to a minimum which reduces the amount of heat created from friction at the contacting surface. The generation of heat is preferably avoided as it accelerates the degradation of the seal and lubricants. Therefore, avoiding the build-up of heat will improve the lifetime and effectiveness of the seal.

Preferably, a first surface the secondary cutter seal is supported by the upper surface of the axially innermost end of the seal retainer and a second surface of the secondary cutter seal is supported by a side surface of the radially outermost part of the seal retainer and wherein the secondary cutter seal comprises a flexible lip which presses against a supporting face of the hub providing sealing in an axial direction. Advantageously, an axial seal is created. The axial seal generates less friction and therefore less heat than a secondary seal that seals in a radial direction, thereby preventing premature failure of the sealing components and lubricants.

Optionally, the side surface of the radially outermost part of the seal retainer comprises a groove. Advantageously, the addition of the groove means that the secondary cutter seal is even more rigidly held in place so that the quality of the seal is maintained. Furthermore, a larger surface area of the secondary cutter seal is protected from exposure to damage from cuttings, therefore increasing the lifetime of the seal.

Preferably, a distance between the supporting face of the hub and the side surface of the axially outermost end of the seal retainer is less than a width of the secondary cutter seal before installation into the roller cutter Advantageously, this means that the secondary cutter seal is compressed slightly when held in position so that is not able to move axially, thus ensuring that the sealing against the supporting face of the hub is maintained. It means that the secondary cutter seal is held in place by axial pre-tension which will prevent cuttings and dirt from passing into the roller cutter.

Preferably, the secondary cutter seal is held in place by pre-tension, glue or clamping. Advantageously, this means that secondary cutter seal will stay in the correct position, so that it is stationary with respect to the seal retainer and able to maintain a good seal against the rotating supporting face of the hub. More preferably, the secondary cutter seal is held in place by pre-tension alone. By using pre-tension alone to hold the secondary cutter seal in place means that the secondary seal can easy be replaced if necessary. Furthermore, fitting of the seal using pre-tension means there are no additional components that could be compromised if the seal is exposed to harsh environments.

Preferably, the secondary cutter seal and the seal retainer are stationary. This means that a good seal is maintained to prevent the passage of the cuttings into the roller cutter.

BRIEF DESCRIPTION OF THE DRAWING

A specific implementation of the present invention will now be described, by way of example only, and with reference to the accompanying drawings.

DETAILED DESCRIPTION

Figure 1:
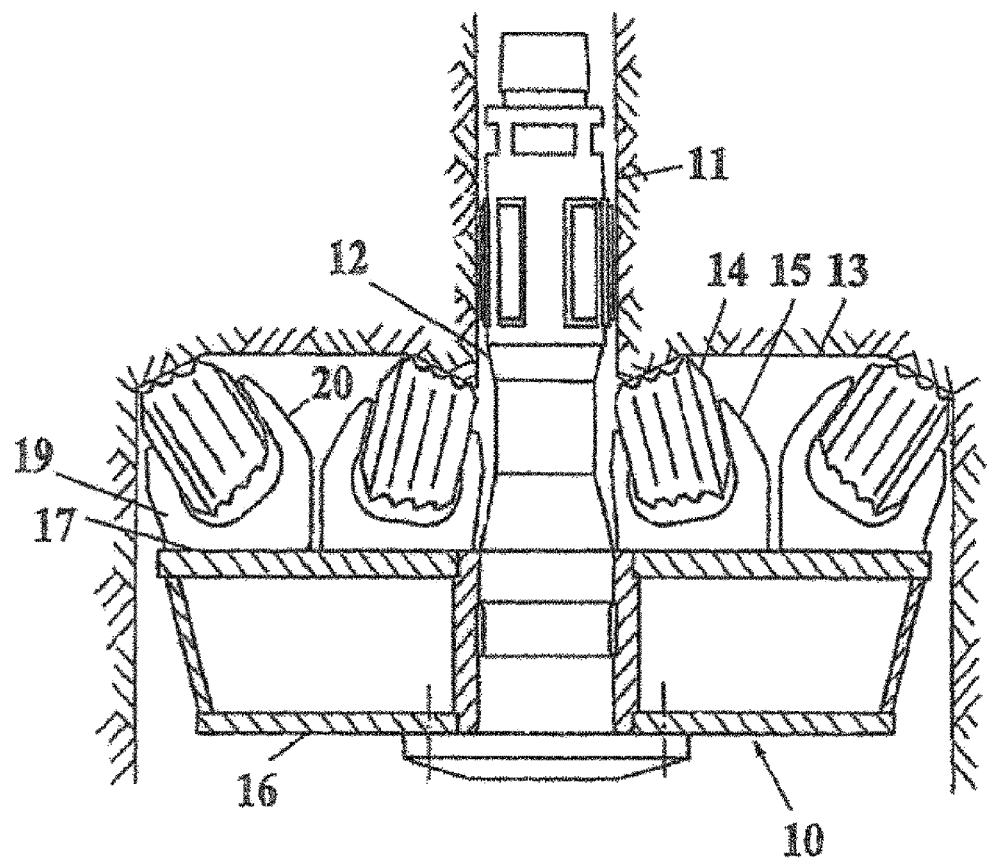
FIG. 1: Schematic drawings of an axial cross section through a raise-boring head.

FIG. 1 shows how a pilot hole 11, which is pre-drilled in known way, between an upper and lower level (not shown). A drill head 10 is connected to drive stem 12, then the drill head 10 is rotated and pressed against the ring-shaped surface 13 that surrounds the pilot hole 11.

The drill head 10 comprises a body 16 and a plurality of roller cutters 14 which are rotatably mounted on the body 16 using saddles 15 (otherwise known as fasteners). The saddles 15 are mounted on the body 16. The drive stem 12 is connected to the body 16. The body 16 has a mounting surface 17 on which the saddles are carried.

Figure 2:
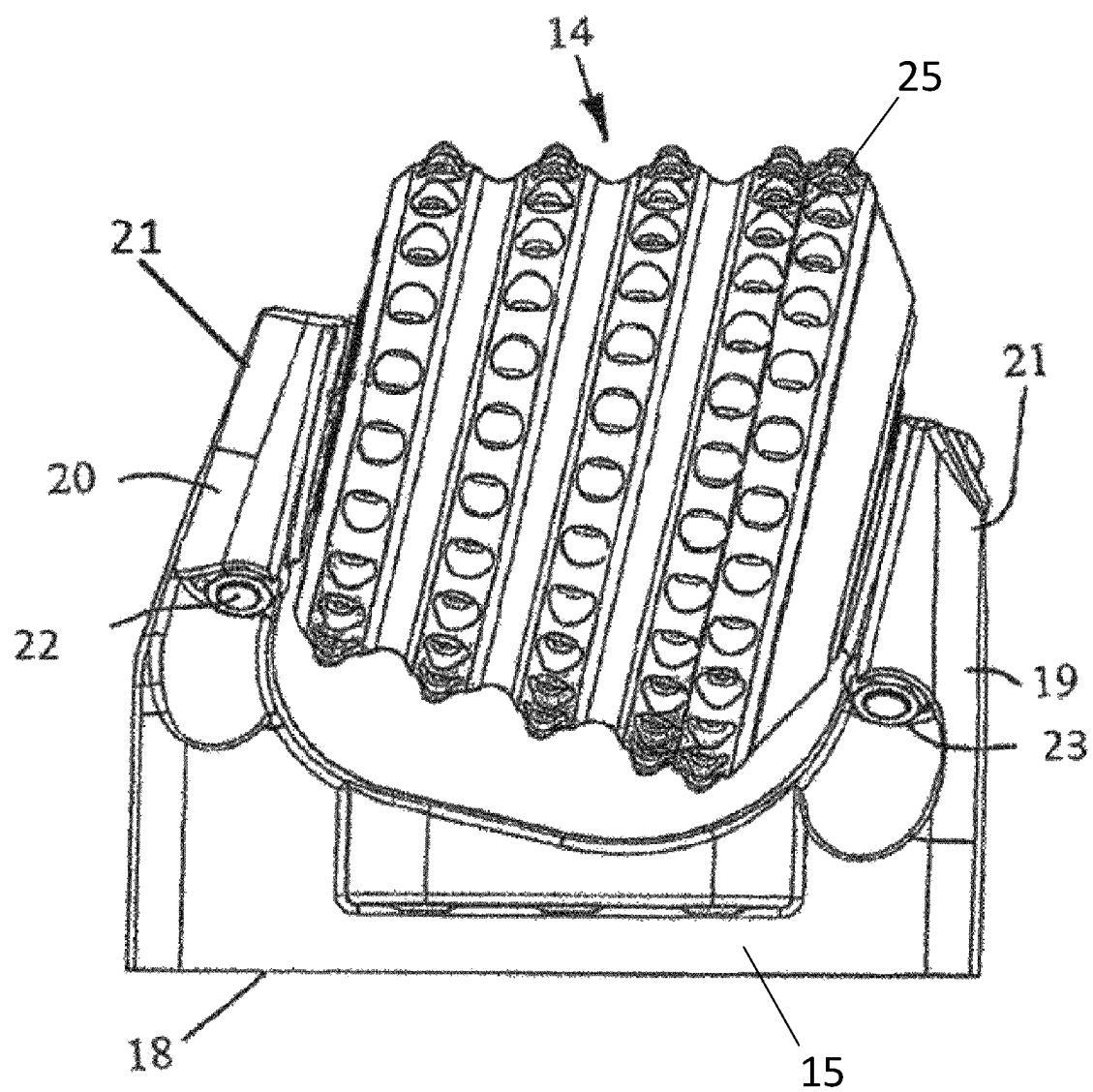
FIG. 2: Schematic drawing of a roller cutter.

FIG. 2 shows that each roller cutter 14 comprises circumferal row of buttons or cutting members 25 of cemented carbide that are mounted in a known way. The saddle 15 comprises a bottom surface 18, which is intended to be connected, for instance by bolting or welding, to the mounting surface 17 of the body 16. The saddle 15 also comprises two saddle cutter seats 19, 20 between which the roller cutter 14 is mounted. The saddle cutter seats, 19, 20, are, at the ends thereof facing away from the bottom surface 18 formed with arms 21. The arms 21 have different lengths from the bottom surface 18. Fastening devices in the form of threaded bolts 22 and nuts 23 are intended to hold the roller cutter 14 and saddle 15 together.

Figure 3:
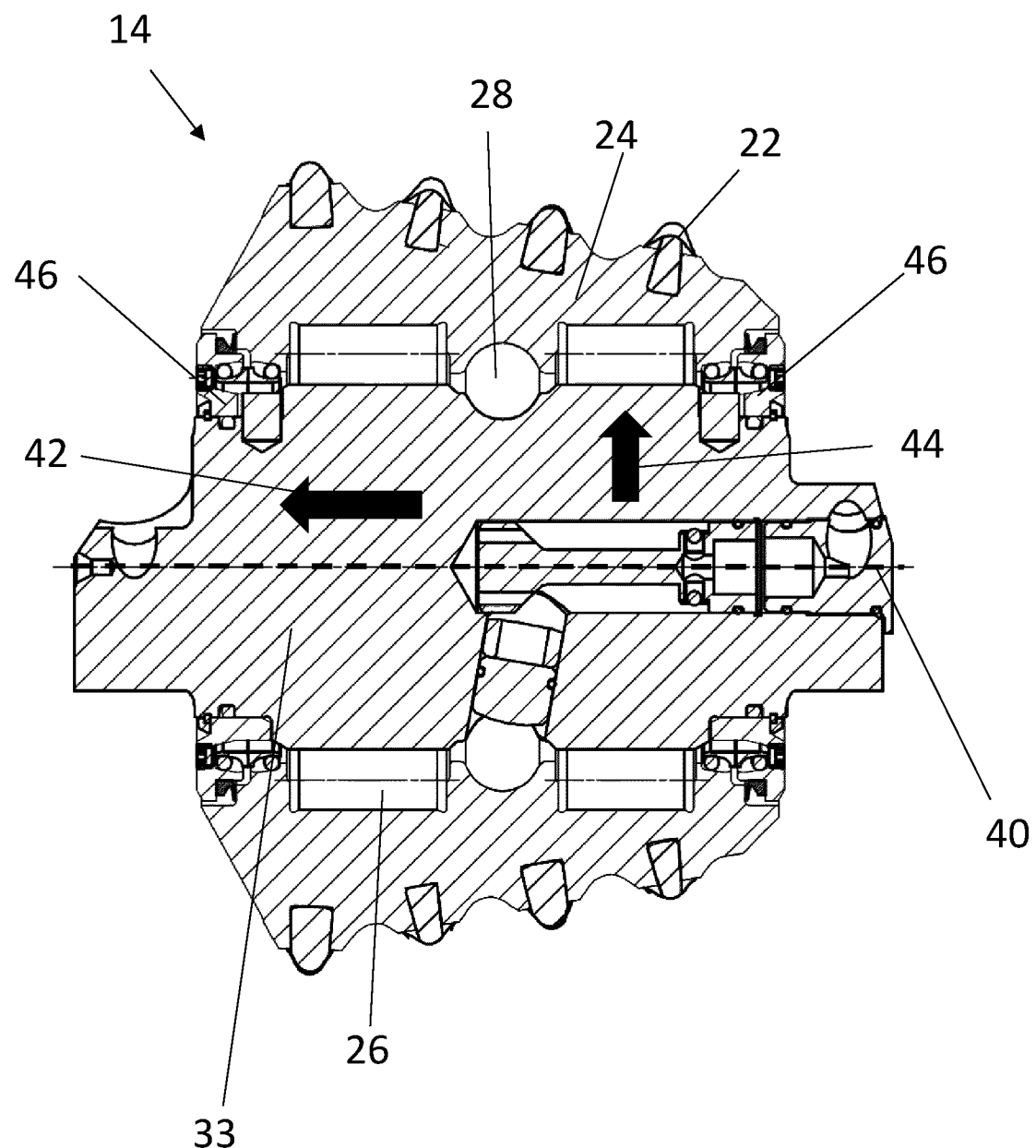
FIG. 3: Cross section through one of the roller cutters.

FIG. 3 shows a cross section of the roller cutter 14 having a shaft 33 with a longitudinal centre line 40. Directions in this description refer to the centre line 40. Axially refers to a direction along the centre line 40 illustrated by a first arrow 42 and radially refers to a direction along the radius of the cross section of the roller cutter 14, illustrated by a second arrow 44. The ends of the shaft 33 along the longitudinal centre line 40 have a machined square, which is intended to abut against a support surface (not shown) in the arms 21 of the saddle 15. A hub 24 (otherwise known as a cutter shell) is rotatably mounted on the shaft 33 via bearing members 26, 28. The bearing members 26, 28 are received in circumferal grooves in a hub 24. The hub 24 is locked axially in relation to the shaft 33. The bearing members 26 are received in a circumferential groove in the hub 24. The hub 24 is locked axially in relation to the shaft by means of a locking member 28, preferably in the form of balls, which co-operate with circumferential grooves in both the shaft 33 and the hub 24. Between the axial ends of the hub 24 and the shaft 33 of the roller cutter 14 at least at one end, preferably both, there is a seal retainer 46.

Figure 4:
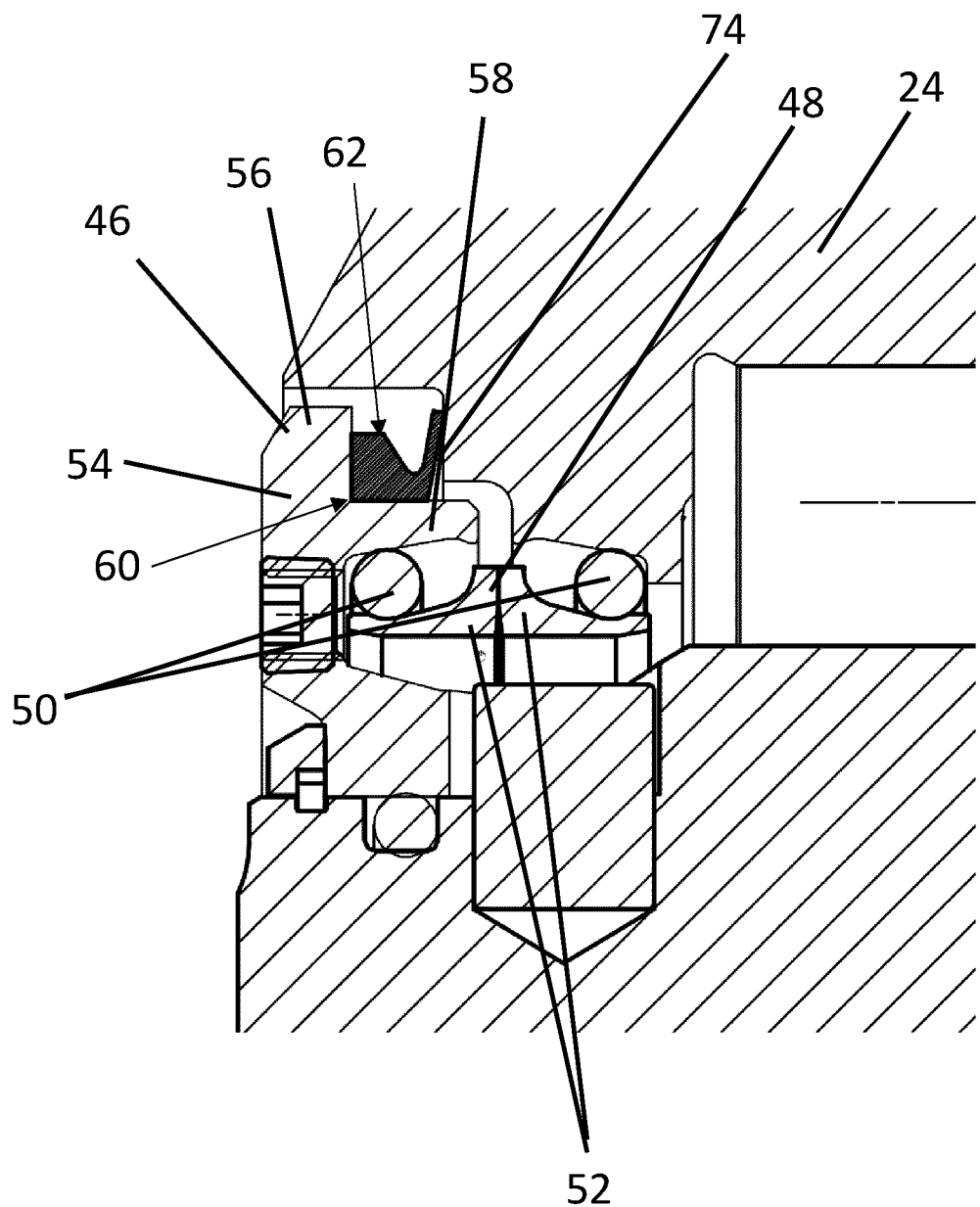
FIG. 4: Enlargement of FIG. 3 showing the seal retainer in more detail.
Figure 5A:
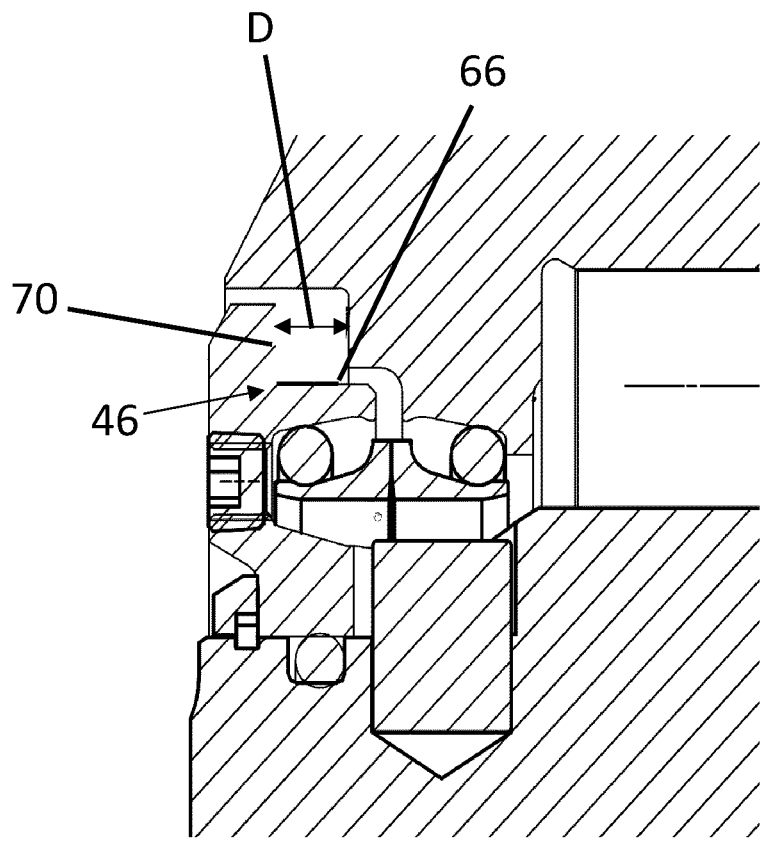
FIG. 5*a*: Enlargement of the roller cutter in the location of the seal retainer before installation of the secondary cutter seal.
Figure 5B:
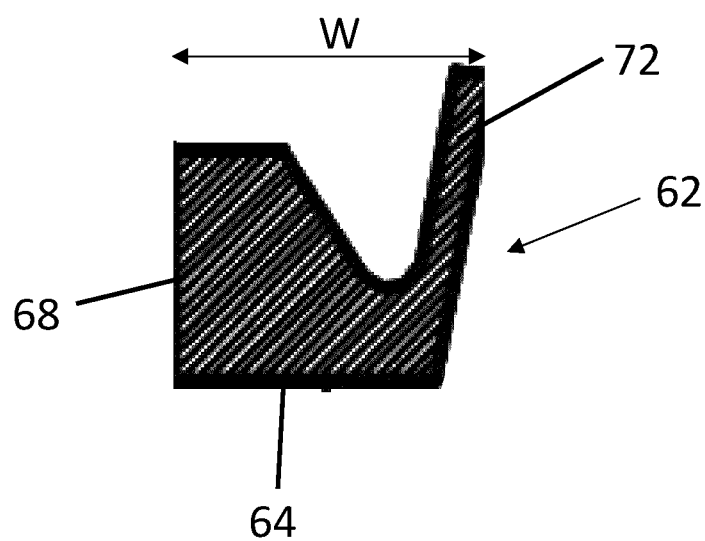
FIG. 5*b*: Enlargement of the secondary cutter seal before installation onto the seal retainer.

FIG. 4 shows an enlargement of the roller cutter 14 in the location of the seal retainer 46. FIG. 5*a* shows an enlargement of the roller cutter 14 in the location of the seal retainer 46 before the secondary cutter seal 62 is installed. FIG. 5*b* shows an enlargement of the secondary cutter seal 62 before being installed onto the seal retainer 46. The seal retainer 46 are typically equipped with relief holes having plugs mounted in said holes to prevent lubricant from leaking out through said holes (not shown) and are typically made from mild steel. The seal retainer 46 supports a primary cutter seal 48. The primary cutter seal 48 typically comprises two O-rings 50 made of a resilient material and two seal rings 52 made of cast iron. The primary cutter seal 48 creates a seal between the hub 24 and the shaft 33 in both axial and radial directions. The primary cutter seal 48 is intended to prevent drill cuttings and other impurities from entering into the roller cutter 14 and the bearing system and to prevent leakage of the lubricants from the roller cutter 14.

The seal retainer 46 has a radially upward projecting region 54 having an axially outermost end 56 and an axially inner most end 58. The radially upward projecting region 54 is stepped such that the axially outermost end 56 projects radially upwards to a larger extent than the axially inner most end 58 therefore forming a stepped region 60. The axially outermost end 56 is located axially and radially further from the primary cutter seal 48 compared to the axially inner most end 58.

The axially innermost end 58 of the axially upward projecting region 54 of the seal retainer 46 accommodates a secondary cutter seal 62. The secondary cutter seal 62 protects the primary cutter seal 48. The secondary cutter seal 62 must be capable of forming an axial seal between seal retainer 46 and the hub 24 using a small contact area relative to the size of the seal. The secondary cutter seal 62 could for example be in the form of a v-ring, wiper seal, lip seal or any other seal that is able to create a seal against the rotating surface of the hub 24 using only a small contact area relative to the size of the seal.

The secondary cutter seal 62 is accommodated in the stepped region 60 of the seal retainer 46, such that a first surface 64 of the secondary cutter seal 62 is supported by the upper surface 66 of the axially innermost end 58 of the seal retainer 46 and a second surface 68 of the secondary cutter seal 62 is supported by a side surface 70 of the axially outermost end 56 of the seal retainer 46. The secondary cutter seal 62 also has a flexible lip 72 which presses towards and then slides against a supporting face 74 of the hub 24 forming a seal in an axial direction. The secondary cutter seal 62 sits stationary on the seal retainer 46. The secondary cutter seal 62 is made of a resilient material that is resistant to heat and wear e.g. rubber. The secondary cutter seal 62 is held in place by pre-tension, glue or clamp. Preferably, the secondary cutter seal 62 is held in place by radial pre-tension alone by the seal retainer 46 being dimensioned slightly larger than the secondary cutter seal 62, so that it is fitted in place by being stretched onto the seal retainer 42.

The distance (D) between the supporting face 74 of the hub 24 and the side surface 70 of the axially outermost end 56 of seal retainer 46 is slightly less than the width (W) of the secondary cutter seal 62 before being installed onto the seal retainer 46, so that when the secondary cutter seal 62 is inserted it compresses to ensure constant sealing against the supporting face 74. The secondary cutter seal 62 forms a seal between the seal retainer 46 and the hub 24 in an axial direction and is intended to protect the primary cutter seal 48 from wear and damage.

Figure 6:
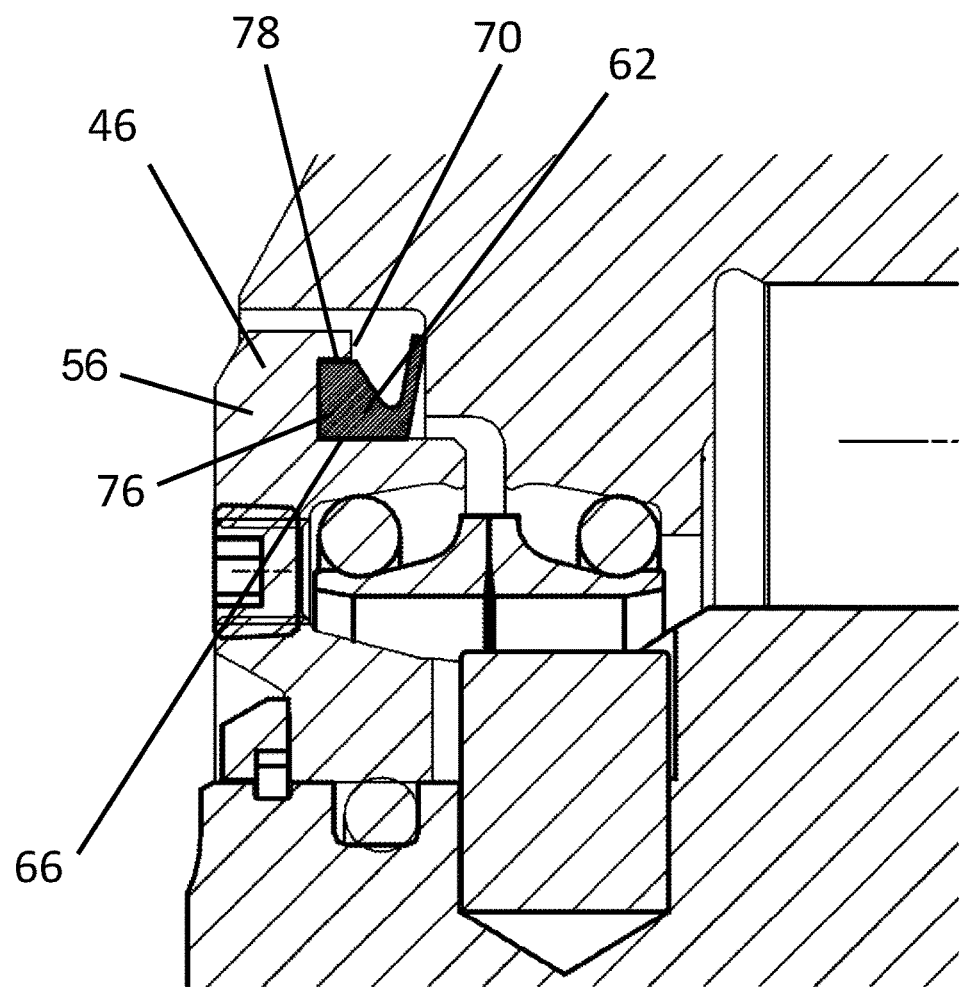
FIG. 6: Alternative version of the seal retainer having a groove.

FIG. 6 shows that optionally, there is a groove 76 in the side surface 70 of the seal retainer 46 in which the secondary cutter seal 62 is positioned inside. The secondary cutter seal 62 abuts the outer diameter 78 of the groove 76, the upper surface 66 of the axially innermost end 58 of the seal retainer 46.

The invention claimed is:

1. A roller cutter for a drill head for raise boring, the roller cutter comprising:
    a shaft with a longitudinal center line;
    a hub rotatably mounted on the shaft;
    a seal retainer located between axial ends of the hub, the shaft being arranged at at least one end of the roller cutter, the seal retainer supporting a primary cutter seal providing sealing between the shaft and the hub in both axial and radial directions, wherein the seal retainer includes a radially upward projecting region having an axially outermost end and an axially innermost end; and
    a secondary cutter seal located between the seal retainer and the hub, wherein the secondary cutter seal provides sealing in the axial direction, wherein a first surface of the secondary cutter seal is supported by an upper surface of the axially innermost end of the seal retainer and a second surface of the secondary cutter seal is supported by a side surface of the axially outermost end of the seal retainer, and wherein the side surface of the axially outermost end of the seal retainer includes a groove.

2. The roller cutter according to claim 1, wherein the radially upward projecting region is stepped such the axially outermost end projects radially upwards to a larger extent than the axially inner most end.

3. The roller cutter according to claim 1, wherein the secondary cutter seal is made of a resilient material.

4. The roller cutter according to claim 1, wherein the secondary cutter seal is a v-ring, wiper or lip seal.

5. The roller cutter according to claim 1, wherein the secondary cutter seal includes a flexible lip which presses against a supporting face of the hub providing sealing in an axial direction.

6. The roller cutter according to claim 5, wherein a distance between the supporting face of the hub and the side surface of the axially outermost end of the seal retainer is less than a width of the secondary cutter seal before installation onto the roller cutter.

7. The roller cutter according to claim 1, wherein the secondary cutter seal is held in place by pre-tension, glue or clamping.

8. The roller cutter according to claim 1, wherein the secondary cutter seal and the seal retainer are stationary.

* * * * *